Jan. 9, 1968  W. S. NICHOLS  3,362,497
INDUSTRIAL TRUCK
Filed June 9, 1965  3 Sheets-Sheet 3
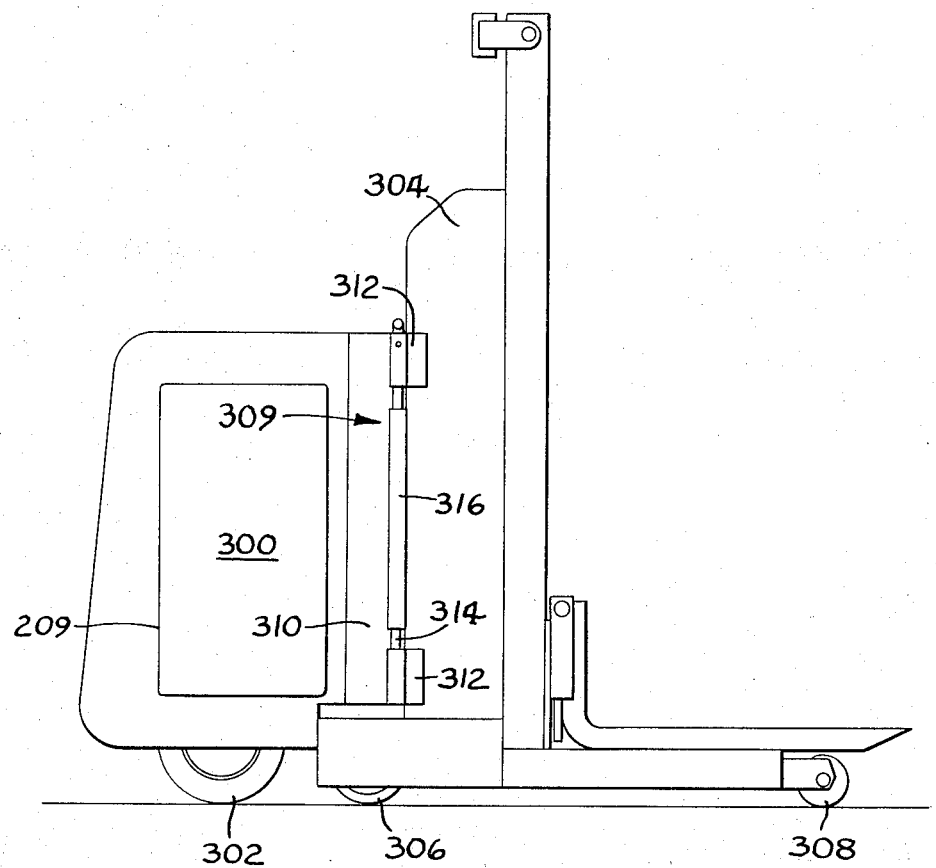
FIG_10_
INVENTOR.
Walter S. Nichols,
BY
Paul & Paul
ATTORNEYS.

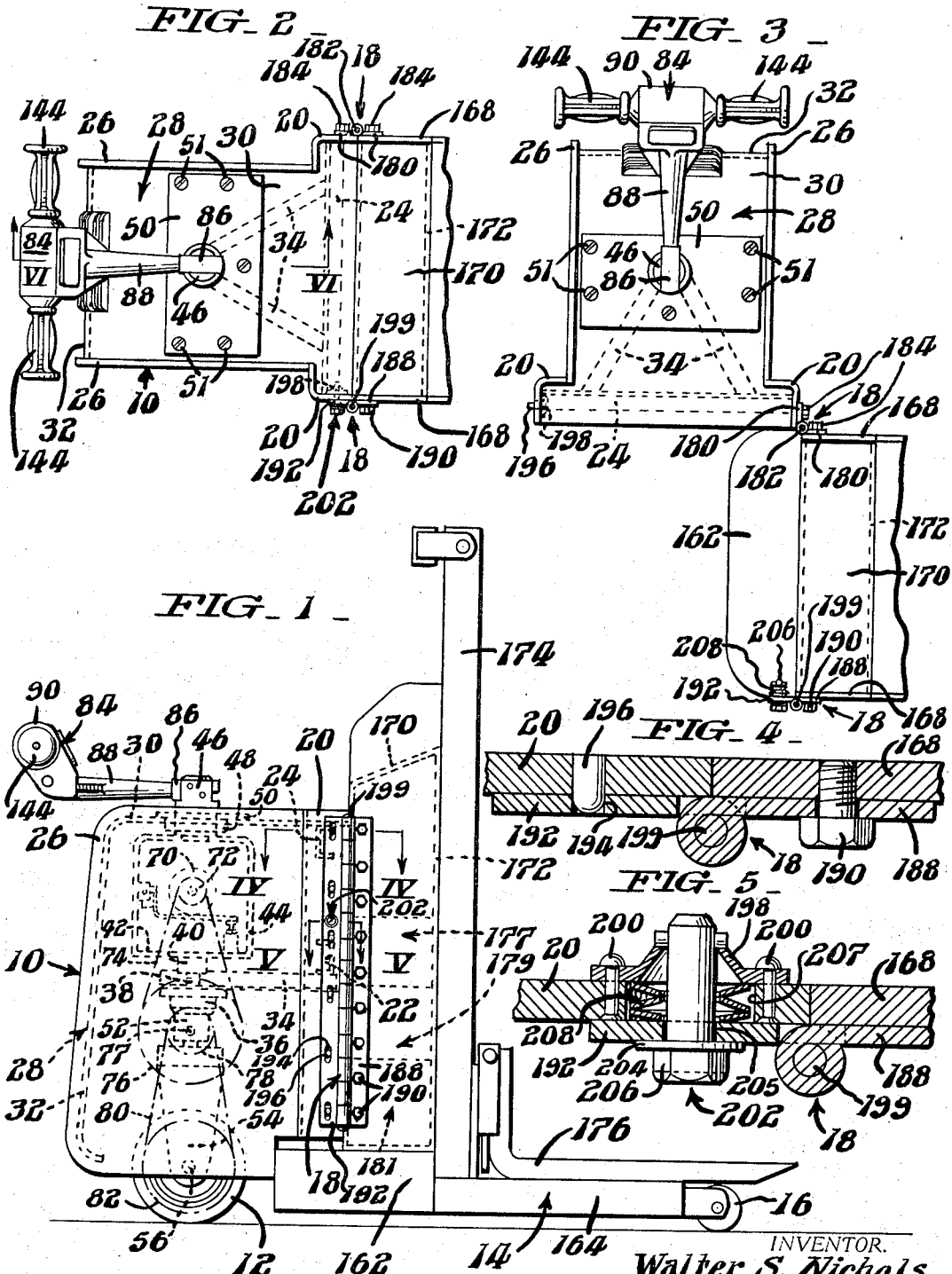

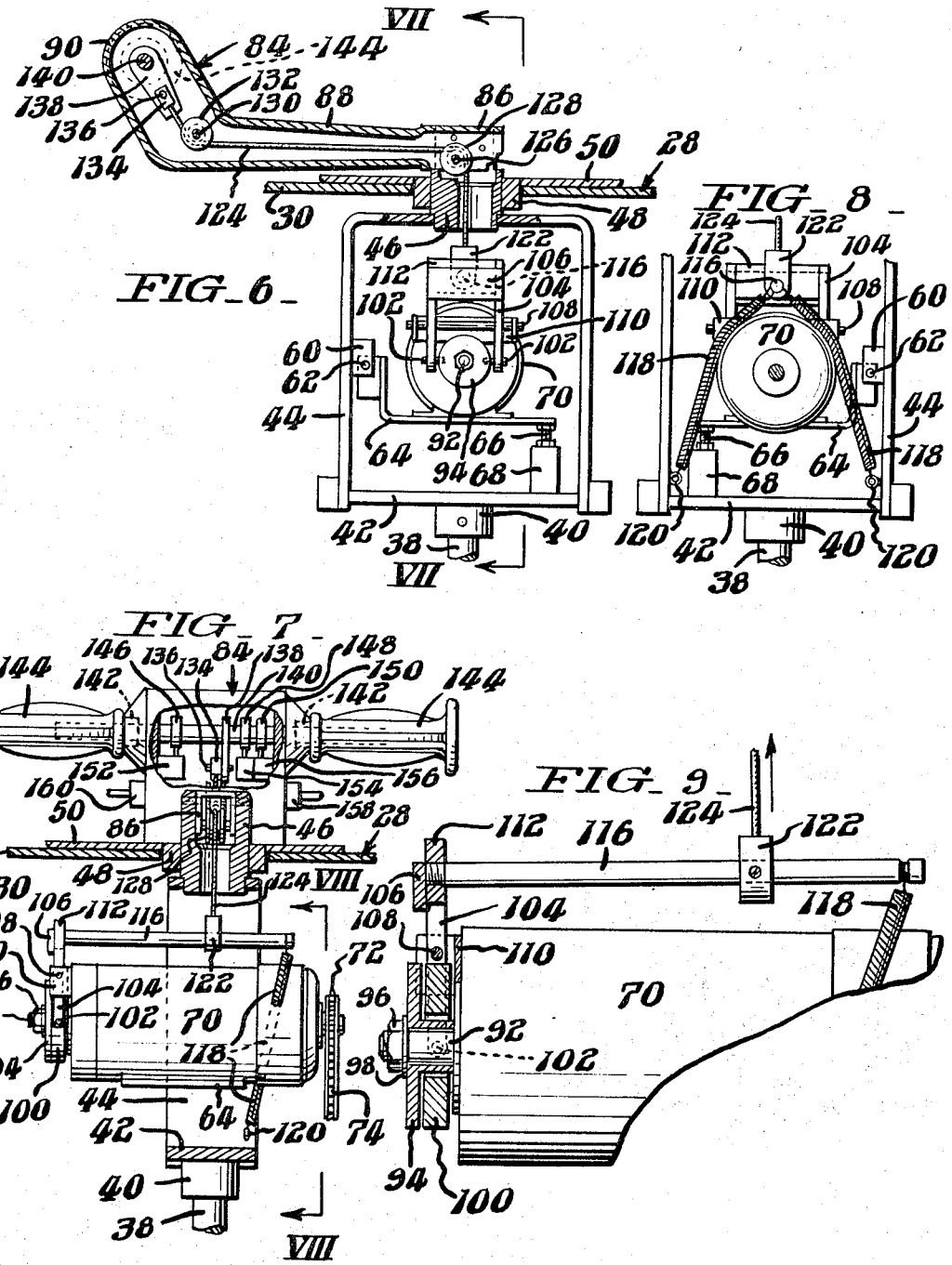

United States Patent Office 3,362,497
Patented Jan. 9, 1968

3,362,497
INDUSTRIAL TRUCK
Walter S. Nichols, Philadelphia, Pa., assignor to Universal American Corporation, New York, N.Y., a corporation of Delaware
Filed June 9, 1965, Ser. No. 462,660
5 Claims. (Cl. 180—19)

ABSTRACT OF THE DISCLOSURE

A power drive unit is supported on a single ground engaging drive wheel, and a driven unit is supported on a pair of ground engaging load wheels. The two units are secured together by a load carrying hinge located to one side of the truck for swinging movement of the power drive unit relative to the driven unit about a vertical axis. The truck is provided with a control system which automatically cuts off the power before the brake is applied and automatically releases the brake before the power is applied.

---

This invention relates generally to industrial trucks, and particularly to powered material handling trucks of the type operated by a walking attendant.

A principal obect of the invention is to provide an improved truck having a power drive unit secured to a driven unit by means of a non-articulated attachment, and having ground engaging wheels effecting a tricycle suspension system.

Another obect is to provide such a truck wherein the power drive unit and the driven unit are secured together by a load carrying hinge, located to one side of the truck, for relative swinging movement about a vertical axis.

Another obect is to provide such a truck with a deadman mechanical brake mechanism which operates automatically when the control handle is released.

Another obect is to provide such a truck with a control system whereby when the brake is applied, the power to the drive motor is automatically cut off first before the brake becomes effective, and when the power is turned on, the brake is automatically released first before the motor is energized.

Other objects will become apparent when the following description is read with reference to the accompanying drawings, wherein:

FIGURE 1 is a side elevation of a truck constructed in accordance with the invention;

FIGURE 2 is a fragmentary top view of the truck shown in FIGURE 1;

FIGURE 3 is similar to FIGURE 2, but shows the power drive unit unlatched from the driven unit and swung to one side for access to the interior;

FIGURES 4 and 5 are enlarged sections respectively on lines IV—IV and V—V in FIGURE 1;

FIGURE 6 is an enlarged fragmentary section on line VI—VI in FIGURE 2;

FIGURE 7 is a section on line VII—VII in FIGURE 6;

FIGURE 8 is a section on line VIII—VIII in FIGURE 7;

FIGURE 9 is an enlarged fragmentary view, partly in section, showing details of the brake mechanism; and FIGURE 10 is a schematic side elevation of a modified truck constructed in accordance with the invention.

The following description is directed to the specific form of the invention shown in the drawings. It is not addressed to the scope of the invention, which may be practiced in a variety of forms.

The industrial truck constructed in accordance with the invention comprises a power drive unit 10 supported on a single ground engaging drive wheel 12, and a driven unit 14 supported on a pair of axially spaced ground engaging load wheels 16. The power drive unit and the driven unit are secured together by non-articulated means, designated 18.

The power drive unit 10 comprises a pair of upright, laterally spaced members 20 interconnected by a pair of horizontally extending vertically spaced crossties 22 and 24. Extending rearwardly respectively from the members 20 are a pair of upright side plates 26, and interposed between the side plates 26 is a plate 28 having a rearwardly extending top section 30 terminating in a depending section 32 at the rear of the unit. Extending rearwardly from the crosstie 22 is a bracket 34. The frame members 20, crossties 22 and 24, side plates 26, plate 28 and bracket 34 are secured together to form a rigid frame structure.

To the undersurface of the bracket 34 is secured a bearing 36. Journaled in the bearing 36 is a steering shaft 38. At the upper end of shaft 38 is a collar 40 by means of which it is secured to a plate 42. Mounted upon the plate 42 is a bracket 44 of inverted U-shape. Extending through and affixed to the top of the bracket is a tiller or control box support 46. The upper end of the support 46 is journaled in a sleeve 48 which extends freely through the section 30 of the plate 28, and which is affixed to a plate 50 secured to the plate 30 by means of screws 51. Disposed transversely of the steering shaft is a countershaft support 52, and affixed to the lower extremity of the steering shaft is a fork 54 in which is journaled a shaft 56 mounting the drive wheel 12. Secured to the bracket 44 is a bracket 60 carrying a pivot pin 62 to which is connected one end of a motor plate 64, the opposite end of the motor plate is seated upon a bolt 66 carried by an adjusting lug 68 mounted upon the plate 42. Seated upon the motor plate is an electric motor 70. On the power take-off shaft of the motor is mounted a sprocket 72 over which is trained a chain 74. The chain 74 is also trained over a sprocket 76 mounted on one end of a countershaft 77. On the opposite end of the countershaft is a sprocket 78 about which is trained a chain 80. The chain 80 is also trained over a sprocket 82 mounted on the shaft 56.

Carried by the support 46 is a tiller or control box, generally indicated 84. The fore end of the tiller 84, of inverted U-shape, as at 86, is rigidly connected to the upper extremity of the support 46. Extending rearwardly from the part 86 is a hollow tubular section 88 which terminates in an enlarged tubular section 90, as shown.

The tail end of the motor shaft, designated 92, mounts a stationary brake disc 94 secured by a nut 96 and a washer 98. Interposed between the disc 94 and the end of the motor is an axially shiftable brake disc 100. On diametrically opposite sides of the disc 100 are a pair of radially outwardly extending pins 102 respectively connected to the legs 104 of a yoke, the legs of the yoke being interconnected by a member 106. A pin 108 passes through the legs of the yoke and opposite end portions thereof are journaled in a bracket 110. Adjustably fixed to the plate 106 is a plate 112 from which there extends a brake rod 116. The opposite end of the brake rod is biased downwardly by a pair of tension springs 118 anchored, as at 120, to the bracket 44. Intermediate the ends of the brake rod 116 is an element 122 which serves to anchor a cable 124 to the rod 116. The cable passes over a pulley 128 mounted by a shaft 126 which has opposite end portions supported respectively in opposed areas of the tiller part 86. The cable also passes under a pulley 132 which is mounted upon a shaft 130 which has opposite end portions supported respectively in opposed areas of the tiller part 90. The opposite end of the cable is connected by a clamp 134 to a pivot pin 136 which is attached to a brake lever 138 affixed to a control rod 140. The control rod is journaled in a pair of bearings 142, and fitted over the opposite end portions thereof respectively are a pair of hand grips 144. Mounted upon the control rod are a set of cams 146, 148 and 150 respectively associated with micro-switches 152, 154 and 156. Mounted on one side of the tiller is a toggle switch 158, and mounted on the opposite side of the tiller is a key switch 160.

The exemplary driven unit 14 comprises a transversely extending fore section 162 from which there extends forwardly a pair of laterally spaced rails 164 carrying at their forward extremities ground engaging load wheels 16. Extending upwardly from the fore section 162 on opposite sides of the unit are a pair of side plates 168. Extending across the unit between the side plates 168 is a plate 172 terminating at the upper end thereof in a section extending rearwardly therefrom, designated 170. Immediately in front of the plate 172, on opposite sides of the unit, are a pair of laterally spaced masts 174. In front of the masts 174 and overlying the rails 164 is a fork and back plate assembly 176.

The section 162 and plates 168 and 172 form a compartment which houses a hydraulic pump system (not shown) for the assembly 176, an oil reservoir 177, battery charging equipment 179 and a battery system 181.

The power drive unit and the driven unit are connected together by means of a butt hinge having leaves 180 connected together by a pin 182. The leaves 180 are secured respectively to the drive unit and the driven unit by means of bolts 184. On the opposite side of the unit is a butt hinge including a leaf 188 secured to the driven unit by means of bolts 190 and a leaf 192 having formed therein a series of slots 194 respectively receiving pins 196 extending outwardly from the power drive unit. The leaves are interconnected by means of a pin 199. Secured to the member 20, as by rivets 200, is receptacle 198 of a one-half turn fastener, generally designated 202. A bolt 206 extends through a flat washer 204, through a round hole 205 in the leaf 192 and through spring washers 208, nested in a round hole 207 in the member 20, for operative engagement with the receptacle 198.

In the operation of the truck, when the key switch 160 is operated, power is made available. The electrical circuit is such that when the toggle switch 158 is switched to the "on" position, the attendant has a choice of running at high or low speed. There are two speeds forward and two in reverse. When the toggle switch 158 is turned to the "off" position, the high speed is cut out. This is normally done when the truck is handling a heavy load. In this event, there is one speed forward and one speed in reverse. The control rod 140 is turned about its axis in the direction of desired travel, and the speed is increased by increasing the rotation of the handle. Braking of the truck is effected by releasing the control rod 140, and steering is effected by swinging the tiller 84 to the right or to the left.

To start the truck, the control rod 140 is turned about its axis clockwise (as viewed in FIGURE 1) to go forward, counterclockwise to go backwards. Turning of the control rod causes the brake lever 138 to pull upwardly on the cable 124. Thus the brake rod 116 is raised against the action of springs 118, and the yoke 104, 106 swings counterclockwise about the pin 108, whereupon the brake disc 100 is shifted to the right out of contact with the brake disc 94. Immediately thereafter if the control rod is turned clockwise, cam 150 closes switch 156 making a circuit which supplies current to the motor for movement forwardly at low speed. Further movement of the control rod clockwise to a second position causes cam 148 to close switch 154 making a circuit which supplies current to the motor for movement forwardly at a higher speed. If the control rod is turned counterclockwise instead of clockwise, cam 146 closes switch 152 making a circuit which supplies current to the motor for movement backwards at low speed. Further movement of the handle counterclockwise to a second position causes the cam 148 to close switch 154 making a circuit which supplies current to the motor for movement backwards at high speed.

When the control rod is released, the springs 118 pull the brake rod 116 downwardly, and the yoke 104, pivots clockwise about pin 108. Thus the brake disc 100 is shifted to the left into face-to-face contact with the brake disc 94, whereupon the motor stops. Just before the brake is applied, switches 146, 148, 150 are all open and power to the motor is cut off. The cable 124 pulls the brake lever 138 to the position shown.

It will be noted that the control rod controls forward and reverse movement, speed selection, and braking action.

When the vehicle needs to be serviced, the bolt 206 is given half a turn to disengage it from the receptacle 198. Then the hinge leaf 192 is turned outwardly and forwardly to disengage it from the pins 196. Now the control rod is turned counterclockwise, whereupon power is furnished to the motor to move the power unit rearwardly. The power unit thereupon swings about the hinge pin 182 from the position of FIGURE 2 to the position of FIGURE 3. In the relative positions of the power drive unit and the driven unit shown in FIGURE 3, the interior of the power drive unit is exposed for servicing. In addition, the compartment housing the hydraulic pump system, oil reservoir 177, battery charging equipment 179 and battery system 181 is exposed for easy access to the equipment.

After servicing is completed, the control rod is turned forwardly and power is furnished to the motor for forward movement. The power drive unit thereupon swings back to the closed position. The bolt 196 is then given a half turn in the opposite direction to latch the power drive and driven units together.

It will be noted that the tricycle means of suspension effected by non-articulated attachment of the power drive unit to the driven unit produces, in addition to positive ground contact of all three wheels regardless of floor conditions, an automatic increase in the weight on the drive wheel, in direct proportion to the load carried by the truck. There is no need for artificial loading.

By contrast, with articulated or four wheel suspension, i.e., when the driven unit is equipped with four load supporting wheels, normally the drive wheel must be artificially loaded in order to develop traction sufficient for propelling a fully loaded vehicle. When the vehicle is unloaded, there is no practical way of eliminating the artificial load, in consequence of which there is unnecessary tire wear and power consumption during light load operation.

In the event that the overall length of the vehicle is to be held to a minimum, the compartment at the rear of the driven unit is eliminated and the batteries, instead of being housed therein, are mounted respectively on opposite sides of the power drive unit, as indicated by broken lines at 209. In this event, the power drive unit preferably is fitted with a pair of caster wheels (not shown) respectively on opposite sides thereof. These caster wheels do not normally engage the ground; they merely function to secure the power drive unit against tilting over.

It will be noted that no vertical movement is permitted between the leaves of the butt hinges attaching the power drive unit to the driven unit. However, if the power drive unit is attached to a driven unit which is carried by four instead of two wheels (see FIGURE 10), provision may be made for relative vertical movement between the leaves of the hinges. In this event, the location of the batteries becomes of utmost importance because sufficient weight is required on the drive wheel to insure traction. The batteries have sufficient weight to insure traction and should be mounted respectively on opposite sides of the power drive unit so that practically all of their weight bears on the drive wheel.

Referring to FIGURE 10, the power drive unit, generally designated 300, is supported on the drive wheel 302, and the driven unit, generally designated 304, is supported on a pair of axially spaced rear wheels 306 and a pair of axially spaced front wheels 308. The power drive unit and the driven unit are connected together by means of a pair of butt hinges 309 each having a leaf 310 affixed by any known means to the associated side of the power drive unit, and a pair of leaves 312 affixed by any known means to the associated side of the driven unit. The leaves of each hinge 309 are interconnected by a pin 314. It will be noted that when the truck is on level ground, the leaves 312 of each hinge are spaced a substantial distance respectively from the opposite ends of the pin embracing part 316 of the leaf 310, and that the part 316 is slidable axially of the pin 314. It will also be noted that the pin 314 of at least one of the hinges is readily removable to provide for separation of its hinge leaves 310 and 312 so that the power drive unit 300 may be swung about the axis of the other hinge pin 314 to expose the interior of the power drive unit for servicing, as described hereinbefore. It will be appreciated that by reason of the relative vertical movement between the power drive unit and the driven unit made possible by the hinges 309 movement of the truck over uneven ground is facilitated.

What is claimed is:

1. In a powered material handling truck of the type operated by a walking attendant, the combination comprising a power drive unit, and a driven unit in front of said power drive unit, said power drive unit including a rigid frame carried by a single ground engaging drive wheel and open across the front thereof for access to its interior, said driven unit including a rigid frame carried by a plurality of ground engaging wheels and extending across said opening thereby to close the same, and means connecting said power drive and driven units including a hinge arranged for swinging movement of said power drive unit relative to said driven unit about a vertically extending axis on one side of said truck whereby to expose the interior of said power drive unit through said opening, and means on the opposite side of said truck releasably securing said power drive unit against swinging movement relative to said driven unit.

2. The combination according to claim 1 wherein the driven unit is carried by a pair of axially spaced ground engaging wheels whereby to effect, with the drive wheel, a tricycle suspension of said power drive and driven units, and the hinge is a vertically extending load carrying butt hinge.

3. The combination according to claim 1 wherein the driven unit is carried by a pair of axially spaced ground engaging front wheels and a pair of axially spaced ground engaging rear wheels, and the leaves of each hinge are adapted for vertical shifting movement relative to each other.

4. In a power unit for a material handling truck of the type operated by a walking attendant, the combination comprising a rigid frame, steering means including an upright member mounted in said frame for turning about a vertical axis, a ground engaging wheel mounted upon said member, and a manually controlled tiller connected to said member and swingable horizontally to either side for turning said member and wheel as a unit, a motor carried by said member, means drivingly connecting said motor with said wheel, said motor and the means connecting the same to said wheel being mounted for turning with said member, a brake operable for arresting said wheel, a control rod mounted upon said tiller for being manually rocked about the axis of said control rod, lever means on said control rod and extending radially therefrom, a brake rod, spring means connected to said brake rod for maintaining said brake in applied position, link means connected between said lever means and said brake rod and adapted when said control rod is rotated on its axis in either direction from its normal position to pull said brake rod against the action of said spring means to release said brake, means responsive to manipulation of said control rod beyond the brake-releasing portion for energizing said motor and thereby driving said wheel, said spring means in response to release of said control rod automatically returning said control rod to its normal position and automatically applying said brake.

5. The combination according to claim 4 characterized in that a plurality of cams are affixed to the control rod for turning therewith, a plurality of switches connected in electric circuit with said motor are mounted for operation respectively by said cams, and said control rod through said link means is operable for releasing said brake first before actuating said switches through said cams for energizing said motor, and is operable for actuating said switches through said cams for deenergizing said motor before said brake is applied through said spring means.

References Cited

UNITED STATES PATENTS

| | | |
|---|---|---|
| 2,520,857 | 8/1950 | Schreck. |
| 2,592,091 | 4/1952 | Weaver _____ 180—13 |
| 2,645,297 | 7/1953 | Wennberg et al. |
| 2,743,784 | 5/1956 | Karlsson _____ 180—1 |
| 2,942,679 | 6/1960 | Gibson _____ 180—65 X |
| 2,959,235 | 11/1960 | Hubbart et al. _____ 180—13 |
| 3,187,829 | 6/1965 | Ulinski _____ 180—19 |
| 3,202,233 | 8/1965 | Dolphin _____ 180—13 |

BENJAMIN HERSH, *Primary Examiner.*

J. A. PEKAR, *Assistant Examiner.*